United States Patent

Schober

(10) Patent No.: US 6,567,169 B1
(45) Date of Patent: May 20, 2003

(54) METHOD OF AND DEVICE FOR DETERMINING THE WARPAGE OF A WAFER

(75) Inventor: Joachim Schober, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 142 days.

(21) Appl. No.: 09/649,939

(22) Filed: Aug. 29, 2000

(30) Foreign Application Priority Data

Aug. 31, 1999 (EP) .............................................. 99890278

(51) Int. Cl.$^7$ ................................................ G01B 11/14
(52) U.S. Cl. ........................................ 356/399; 356/614
(58) Field of Search ................................ 356/399–401, 356/614, 622, 623, 624; 250/559.29, 559.3, 548; 355/53, 67, 74, 56

(56) References Cited

U.S. PATENT DOCUMENTS 5,114,234 A * 5/1992 Otsuka et al. ............. 356/358
5,424,552 A * 6/1995 Tsuji et al. ................ 250/548
5,473,424 A * 12/1995 Okumura .................. 356/400
6,122,036 A * 9/2000 Yamasaki et al. ........... 355/53

FOREIGN PATENT DOCUMENTS

DE 4231205 3/1994

* cited by examiner

*Primary Examiner*—Hoa Q. Pham
(74) *Attorney, Agent, or Firm*—Daniel J. Piotrowski

(57) ABSTRACT

A method and device is disclosed for determining deviations of a nominally planar surface of a thin object, which is subject to warpage related to gravity, such as a wafer, relative to a reference plane. The method includes supporting the object by three support members and detecting deviations, wherein the three support members are in a position relative to each other so that each support member is located underneath the point of gravity of a circular sector of the object extending over an angular range of 120°.

5 Claims, 1 Drawing Sheet

METHOD OF AND DEVICE FOR DETERMINING THE WARPAGE OF A WAFER

The invention relates to a method and device for determining deviation of a nominally planar surface of a thin object, relative to a reference plane.

BACKGROUND OF THE INVENTION

Such a method and such a device have for years been used by the applicants and are therefore known. The known solutions are provided and arranged for measuring wafers, so that an object to be measured is formed by a wafer. With the known solutions the support members and, consequently, the support positions are arranged in a more or less arbitrary position relative to each other. The main reason for this lies in the fact that the known solutions are provided for determining deviations of a nominally planar upper surface of a thin and, in essence, circular disk-shaped object, that is, a wafer, relative to a reference plane for which fact the wafer is thin and has a thickness, for example, in the region of 200 $\mu$m or more, but has nevertheless a thickness, that is the thickness of about 200 $\mu$m or more, with which practically no parasitic warpage occurs that can be attributed to the influences of gravity on the wafer. The known solutions are unsuitable for thinner wafers, because parasitic warpage occurs owing to gravity, which warpage leads to additional deviations of the nominally planar surfaces of such a wafer relative to a reference plane, which leads to erroneous measuring results with the known solutions. Since in practice, however, there is a tendency to come to ever thinner wafers, there is a problem that for such thinner wafers no satisfactory measuring results can be achieved with the known solutions with regard to finding deviations in a surface of a wafer relative to a reference plane.

With regard to a known method and a known device, also the publication of patent document DE 42 31 205 A1 may be referred to in this respect. This document has also disclosed the use of three support members lying in the three corners of an equilateral triangle. However, no information is given about the positions of the three support members relative to the object to be measured, that is to a composite body.

SUMMARY OF THE INVENTION

To achieve the above-defined object of the invention, the method includes: determining deviations of a nominally planar surface of a thin object relative to a reference plane, wherein the object is subject to warpage related to gravity, the method comprising the step of supporting the object by three support positions, wherein the three support positions are in a constant position relative to the reference plane; and detecting deviations of the nominally planar surface relative to the reference plane, wherein each support position is located underneath the center of gravity of a circle sector that stretches out over an angular region of 120° of the object.

Providing the characteristic features according to the invention achieves in an extremely simple manner and without additional means that the influence of gravity on the results of the measurement, which can be determined when deviations from a nominally planar surface of a thin and, in essence, circular disk-shaped object are measured relative to a reference plane, can be practically ignored because, based on the invented arrangement of the support members and as a result of the support positions of the object, practically no parasitic warp of the object owing to the influences of gravity occurs.

With a device according to the invention it has proved to be highly advantageous when, the device is adapted very simply to different sizes, thus to different diameters of circular disk-shaped objects.

The above-defined aspects and further aspects of the invention will be evident from the example of embodiment to be described hereinafter and will be explained with reference to this example of embodiment.

These and other aspects of the invention are apparent from and will be elucidated with reference to the embodiments described hereinafter.

DETAILED DESCRIPTION OF THE DRAWINGS

Figure 1:
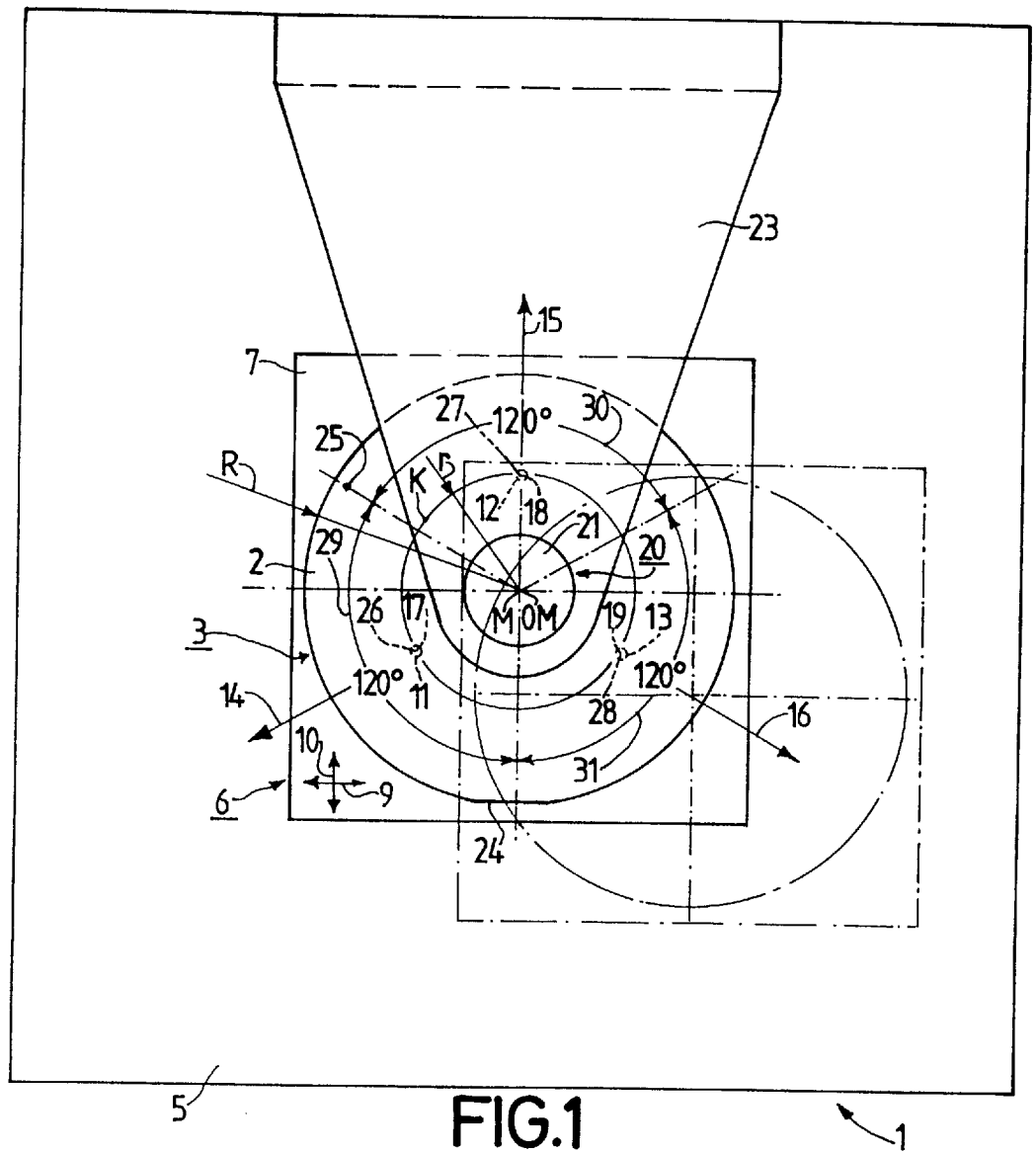
FIG. 1 shows in a highly diagrammatic manner in plan view a device in accordance with an example of embodiment of the invention.
Figure 2:
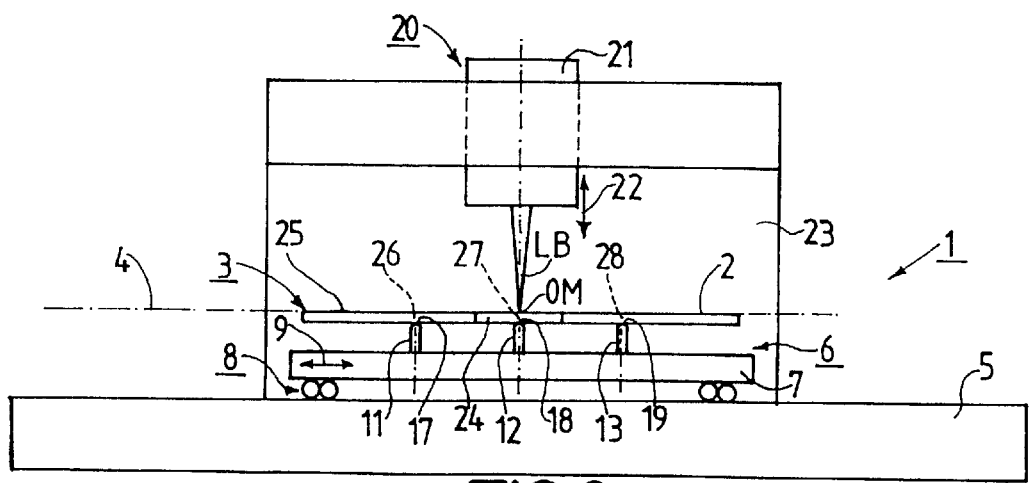
FIG. 2 shows the device shown in FIG. 1 in side view.

FIGS. 1 and 2 represent a device 1 for determining deviations of a nominally planar surface 2 of a thin and, in essence, circular disk-shaped object, that is a wafer 3, relative to a reference plane 4. The reference plane 4 is indicated by a dash-and-dot line in FIG. 2. The wafer 3 is shown exaggeratedly large in its thickness. Furthermore, it should be observed that the wafer 3 in FIG. 2 is shown to be perfectly flat. In practice, however, the wafer may have deviations from a totally flat form, so that the nominally planar surface 2 of the wafer shows deviations from the reference plane 4.

The device 1 has a stable base plate 5. The device 1 further has support means 6. The support means 6 have a carrier plate 7 which can be adjusted relative to the base plate 5 by bearing means 8 schematically shown as balls in the way that the carrier plate 7 can be adjusted relative to the base plate 5 both in the direction of a double arrow 9 and in the direction of a double arrow 10. In this way it is achieved that the carrier plate 7 can be taken to the desired position relative to the base plate 5.

The support means 6 further include three support members 11, 12 and 13 which are formed by pins which are connected to the carrier plate 7 in a manner not shown. The free ends of the support members 11, 12 and 13 formed by pins are shown rounded off and lie in a plane that runs parallel with the reference plane 4. The three support members 11, 12 and 13 lie on a circle K that has a center M. The support members 11, 12 and 13 can be adjusted to each other in a way that each of the three support members 11, 12 and 13 can be adjusted exactly in a radial direction 14, 15 and 16 relative to the center M of the circle K, as is indicated by arrows in FIG. 1.

With the aid of the three support members 11, 12 and 13, the wafer 3 can be supported in the area of three, in essence, point-shaped support positions 17, 18 and 19 and can be positioned with its surface 2 in a position that does not change relative to the reference plane 4.

The device 1 further has detection means 20 by which deviations of the nominally planar surface 2 relative to the reference plane 4 can be detected. In the case at hand, the detection means 20 include an optical microscope 21 which can be adjusted with adjusting means (not shown) of the detection means 20 in parallel with the direction of a double arrow 22. The direction of the double arrow 22 is exactly perpendicular to the reference plane 4. The detection means 20 are suspended from a carrier boom 23, which is connected to the base plate 5.

A light beam LB schematically shown in FIG. 2 can be generated with the aid of the microscope, which light beam can be exactly focused on the surface 2 of the wafer 3, as is shown in FIG. 2.

The following shows the way of operation of the device 1 shown in FIGS. 1 and 2 when a method of determining deviations of a nominally planar surface 2 of the wafer 3 from a reference plane 4 is described:

The wafer 3 to be measured is either manually or automatically inserted into the device 1 and put on the three support members 11, 12 and 13, so that a positioning surface 24 on the wafer 3 lies exactly diagonally across from the second support member 18 relative to the center M.

Furthermore, the carrier plate 7 together with the wafer 3 supported by the support members 17, 18 and 19 is brought to the position shown in FIGS. 1 and 2 in which the center M of the circle K, which here exactly corresponds to the center of the wafer 3, which is ensured by separate positioning means not shown, however, in FIGS. 1 and 2, is exactly aligned with the light beam LB.

Furthermore, the light beam LB in the surface center OM of the wafer 3 is exactly focused on the surface 2 of the wafer 3, which leads to the fact that the microscope 21 is adjusted in parallel with the direction of the double arrow 22. Once the light beam LB in the surface center OM is exactly focused on the surface 2, the microscope 21 takes up a certain relative position, in the present case a certain height position relative to the reference plane 4 through the surface center OM, thus the hit spot of the light beam LB on the surface. This lays down a start position of the microscope 21 relative to the height above the reference plane 4 and thus also the reference plane 4 itself.

Furthermore, the carrier plate 7 together with the wafer 3 supported here by the support members 17, 18 and 19, is adjusted to the relative position indicated by dash-and-dot lines in FIG. 1 relative to the base plate 5 and thus also relative to the microscope 21. The result of this is that the light beam LB occurs from now on at the hit spot of the surface 2 of the wafer 3 indicated in FIGS. 1 and 2 by the reference 25. It is assumed that within the area of the hit spot 25 of the surface 2 there is a deviation of the surface 2 relative to the reference plane 4, that is that the surface 2 in the area of the hit spot 25 lies above the reference plane 4. With these ratios the light beam LB is no longer exactly focused on the hit spot 25, which is determined with the aid of the microscope 21. Consequently, the microscope 21 is from then on adjusted in parallel with the direction of the double arrow 22 until the light beam LB at the hit spot 25 is focused equally exactly on the surface 2. Once the focused state is reached, the microscope 21 is shifted relative to its start position found after the reference plane 4 was determined by a certain stroke parallel with the direction of the arrow 22. This stroke represents a measure for the deviation of the surface 2 at the hit spot 25 relative to the reference plane 4. In this manner the deviation of the nominally planar surface 2 relative to the reference plane 4 is determined in the hit spot 25. The operation described hereinbefore with respect to the hit spot 25 is repeated for a desired number of other hit spots of the surface 2 of the wafer 3, while a measuring result is obtained for each of these hit spots.

Based on all the measuring results, very accurate conclusions can be drawn from the surface ratios in the area of the surface 2 of the wafer 3.

With the device as shown in FIGS. 1 and 2, the three support members 11, 12 and 13 on the carrier plate 7 are advantageously provided so that the three support members 11, 12 and 13 have such a relative position to each other that each support member 11, 12 and 13 is positioned, in essence, underneath the center of gravity 26, 27 and 28 respectively, of a circle sector 29, 30 and 31 that stretches out over an angular region of 120° of the in essence circular wafer 3, which wafer can be supported by the three support members 11, 12 and 13. This is achieved in that in the device 1 the radius r of the circle K at which the support members 11, 12 and 13 are positioned, has a value that results from the radius R of the wafer 3 via the equation r=0.55R.

Based on the fact that each support member 11, 12 and 13 lies underneath the point of gravity 26, 27 and 28 of a circle sector 29, 30 and 31 respectively, there is achieved in a very simple manner and without additional means that the influence of gravity on the measuring results, which can be determined when deviations of nominally planar surfaces 2 of the wafer 3 relative to the reference plane 4 can be detected, may practically be discarded, because based on the advantageous arrangement of the support members 11, 12 and 13 and as a result of the advantageous distribution of the support members 17, 18, 19 over the wafer 3, there is practically no parasitic warp of the wafer 3 caused by the influences of gravity.

Since the support members 11, 12 and 13 can be radially adjusted, the support members 11, 12 and 13 can easily be adjusted to different radial positions and thus easily be adapted to wafers of different diameters.

The invention is not restricted to the example of embodiment described above. In a device according to the invention may also be included differently arranged support means which include three support members arranged according to the invention. Furthermore, also different detection means may be provided, for example, detection means which are suitable for performing an electrically capacitive measurement or detection means operating with laser beams as discussed, for example, in patent document DE 42 31 205 A1 also cited above. Furthermore, not also other disk-shaped objects can be measured exactly as regards the surface variation.

What is claimed is:

1. A method of determining deviations of a nominally planar surface of a thin object relative to a reference plane, the method comprising the step of:

supporting the object subject to warpage related to gravity by at least three radially adjustable support positions, wherein the three support positions are in a constant position relative to the reference plane; and detecting deviations of the nominally planar surface relative to the reference plane, wherein each support position is located underneath the center of gravity of a circle sector that stretches out over an angular region of 120° of the object.

2. The method as claimed in claim 1, wherein the object is a wafer.

3. A device for determining deviations of a nominally planar surface of a thin disk-shaped object relative to a reference plane, said device comprising:

at least three radially adjustable support members to support the object subject to warpage related to gravity, wherein the object is positioned in a constant position relative to the reference plane, and a detection means for detecting deviations of the nominally planar surface relative to the reference plane, wherein the three support members have a position relative to each other such that each support member is located underneath the center of gravity of a circle sector extending over an angular range of 120° of the object.

4. The device as claimed in claim 3, wherein the three support members can be adjusted relative to each other.

5. The device claimed as claimed in claim 3, wherein the device is arranged for determining deviations of a nominally planar surface of a wafer.

* * * * *